United States Patent
Silva et al.

(10) Patent No.: US 10,587,537 B2
(45) Date of Patent: Mar. 10, 2020

(54) CUSTOMIZED RESPONSE MESSAGES

(71) Applicant: International Business Machines Corporation, Armonk, NY (US)

(72) Inventors: Asima Silva, Holden, MA (US); Richard Gorzela, Billerica, MA (US); Jaime M. Stockton, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 15/852,097

(22) Filed: Dec. 22, 2017

(65) Prior Publication Data

US 2019/0199655 A1    Jun. 27, 2019

(51) Int. Cl.
| G06F 15/16 | (2006.01) |
| H04L 12/58 | (2006.01) |
| G10L 17/26 | (2013.01) |
| G06Q 10/10 | (2012.01) |

(52) U.S. Cl.
CPC .............. *H04L 51/02* (2013.01); *G10L 17/26* (2013.01); *H04L 51/12* (2013.01); *G06Q 10/109* (2013.01)

(58) Field of Classification Search
CPC ......... H04L 51/02; H04L 51/12; G10L 17/26; G06Q 10/109
USPC ........................................................ 709/206
See application file for complete search history.

(56) References Cited

U.S. PATENT DOCUMENTS

| 6,870,833 | B2 * | 3/2005 | Schwartz ........ H04M 1/274575 370/353 |
| 8,364,183 | B2 * | 1/2013 | Olincy .................... H04M 1/64 379/360 |
| 9,276,775 | B2 * | 3/2016 | Anantharaman ....... H04L 12/66 |
| 9,413,899 | B1 * | 8/2016 | Shivashankaraiah ........................ H04M 15/00 |
| 2007/0244976 | A1 * | 10/2007 | Carroll ................. G06Q 10/107 709/206 |
| 2009/0070678 | A1 * | 3/2009 | Landar ................. G06Q 10/109 715/733 |
| 2009/0150507 | A1 * | 6/2009 | Davis ...................... H04L 51/14 709/207 |
| 2013/0091224 | A1 * | 4/2013 | Chakra ................ G06Q 10/107 709/206 |
| 2013/0097270 | A1 * | 4/2013 | Plotkin ............. H04M 1/72547 709/206 |
| 2013/0124583 | A1 * | 5/2013 | Ferguson ............... G06Q 10/00 707/821 |

(Continued)

FOREIGN PATENT DOCUMENTS

WO    WO-2010133830 A1 *  11/2010  ............. H04L 51/38

*Primary Examiner* — Anthony Mejia
(74) *Attorney, Agent, or Firm* — Fabian VanCott; Steven L. Nichols (57) ABSTRACT

Generation of customized response messages is described. According to the method, an incoming communication request is received and a relationship between an initiator of the communication request and a recipient of the communication request is determined. Based on a number of calendars for the recipient, an availability of the recipient is determined. When the recipient is unavailable, a customized response message is generated. The customized response message 1) is based on the relationship between the initiator and the recipient and 2) indicates an estimated response time for the recipient based on the availability of the recipient.

20 Claims, 6 Drawing Sheets

(56) References Cited

U.S. PATENT DOCUMENTS

| | | | |
|---|---|---|---|
| 2014/0057610 A1* | 2/2014 | Olincy | H04W 4/16 455/414.1 |
| 2014/0229571 A1* | 8/2014 | Buddenbaum | H04L 67/10 709/217 |
| 2015/0188876 A1* | 7/2015 | Jackson | H04L 51/02 709/206 |
| 2015/0262131 A1* | 9/2015 | Mermelstein | G06Q 10/1095 705/5 |
| 2015/0312731 A1* | 10/2015 | Bendi | H04W 4/12 455/414.1 |
| 2016/0006867 A1* | 1/2016 | Czarnecki | H04M 3/42093 455/414.1 |
| 2016/0026769 A1* | 1/2016 | Williams | G06Q 50/22 705/3 |
| 2016/0036962 A1* | 2/2016 | Rand | H04R 1/1041 455/418 |
| 2017/0005955 A9* | 1/2017 | Plotkin | H04M 1/72547 |
| 2018/0060500 A1* | 3/2018 | Ni | G06Q 10/1097 |

\* cited by examiner

CUSTOMIZED RESPONSE MESSAGES

BACKGROUND

The present invention relates to response messages, and more specifically to generating customized response messages. Sometimes one individual will try to contact, via phone, text, or email, another individual who is unavailable. For example, the other individual may be driving, in a meeting, working, giving a presentation, or be otherwise indisposed. To account for these situations, computing devices, such as cell phones or computers, have pre-created responses to a request to initiate a correspondence. These responses can indicate an unavailability of the individual and can be sent to the individual making the call request with minimum interruption to the unavailable participant.

SUMMARY

According to an embodiment of the present invention, a computer-implemented method for generating and sending a customized response message is described. According to the method, an incoming communication request is received. A relationship is determined between an initiator of the communication request and a recipient of the communication request. Based on a number of calendars for the recipient, an availability of the recipient is determined. When it is determined that the recipient is unavailable, a customized response message is sent. The customized response message 1) is based on the relationship between the initiator and the recipient and 2) indicates an estimated response time for the recipient based on the availability of the recipient.

A system is also described. The system includes a communication unit to receive an incoming communication request. A database of the system includes relationship information between a number of users. Among the number of users are an initiator of the communication request and a recipient of the communication request. The system also includes a number of calendars for the number of users. A response controller of the system generates a customized response message based on a determined unavailability of the recipient. The customized response message 1) is based on the relationship between the initiator and the recipient and 2) indicates an estimated response time for the recipient based on the availability of the recipient.

The present specification also describes a computer program product. The computer program product includes a computer readable storage medium having program instructions embodied therewith. The program instructions are executable by a processor to cause the processor to 1) receive an incoming communication request and 2) determine a relationship between an initiator of the communication request and a recipient of the communication request. The relationship between the recipient and the initiator is based on 1) a quantity of previous correspondence, 2) a frequency of previous correspondence, 3) a type of previous correspondence, 4) a timing of previous correspondence, 5) a vernacular of previous correspondence, and 6) profile information of the initiator. The program instructions are also executable by the processor to cause the processor to determine, based on a number of calendars for the recipient, an availability of the recipient and based on a determined unavailability of the recipient, generate a customized response message. The customized message is based on the relationship between the initiator and the recipient and indicates an estimated response time for the recipient. The estimated response time is based on 1) the availability of the recipient and 2) historical response times following a period of unavailability.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, it may be the case that when a first individual attempts to initiate a correspondence with a second individual, the second individual may be unable to respond immediately. For example, the second individual may be in a meeting, presenting in a meeting, or be otherwise indisposed. In these examples, a computing device may, either automatically, or based on a user action, send a pre-created response to let the first individual know of the unavailability of the second individual. However, these responses are short, and can leave the person who receives the message, i.e., the first individual, wondering how to take the response. The first individual may wonder if the second individual is angry with them, or if something is wrong.

Accordingly, while such pre-created messages are convenient, it may be more effective if a computing device could learn from the behavior of the second individual as well as the relationship between the first individual and the second individual so that the response can be customized and appropriate.

Accordingly, the present specification describes the generation of a customized response message. In addition to generating a response that is based on a relationship between the initiator and the recipient, the response also indicates an estimated response time based on calendars for the recipient. For example, the system may consult calendars for the recipient and learn that the recipient is in a meeting until 2:00 p.m. Accordingly, the generated response may be in a customized tone and using a customized vernacular based on a relationship of the person who sent the request with the person who received the request. Moreover, the response may indicate that the recipient will respond at 2:00 p.m. when the meeting has finished.

In summary, the subject matter of the present disclosure obtains information of when an individual does not have time to respond. The system would learn from the contacted person's history with the contactor, and respond appropriately. The system can use information such as 1) a history of contact including texts, emails, messages, voice recognition, vernacular, and even from profile information on a device, 2) frequency and type of contact, 3) calendar obligations, and 4) prior behavior to generate a customized response message tailored to the individual who sent the request and that gives an estimate of when that individual can expect a response.

Such a system facilitates a customized response that may alleviate any social awkwardness or miscommunication that may result from pre-created generic messages. Moreover, by reviewing a person's calendars, the response message presents the initiator of the request with an estimated time of response, which is more efficient than requiring the initiator to wait without any expectation of when a response will be received. However, it is contemplated that the devices disclosed herein may address other matters and deficiencies in a number of technical areas.

As used in the present specification and in the appended claims, the term "a number of" or similar language is meant to be understood broadly as any positive number including 1 to infinity.

Figure 1:
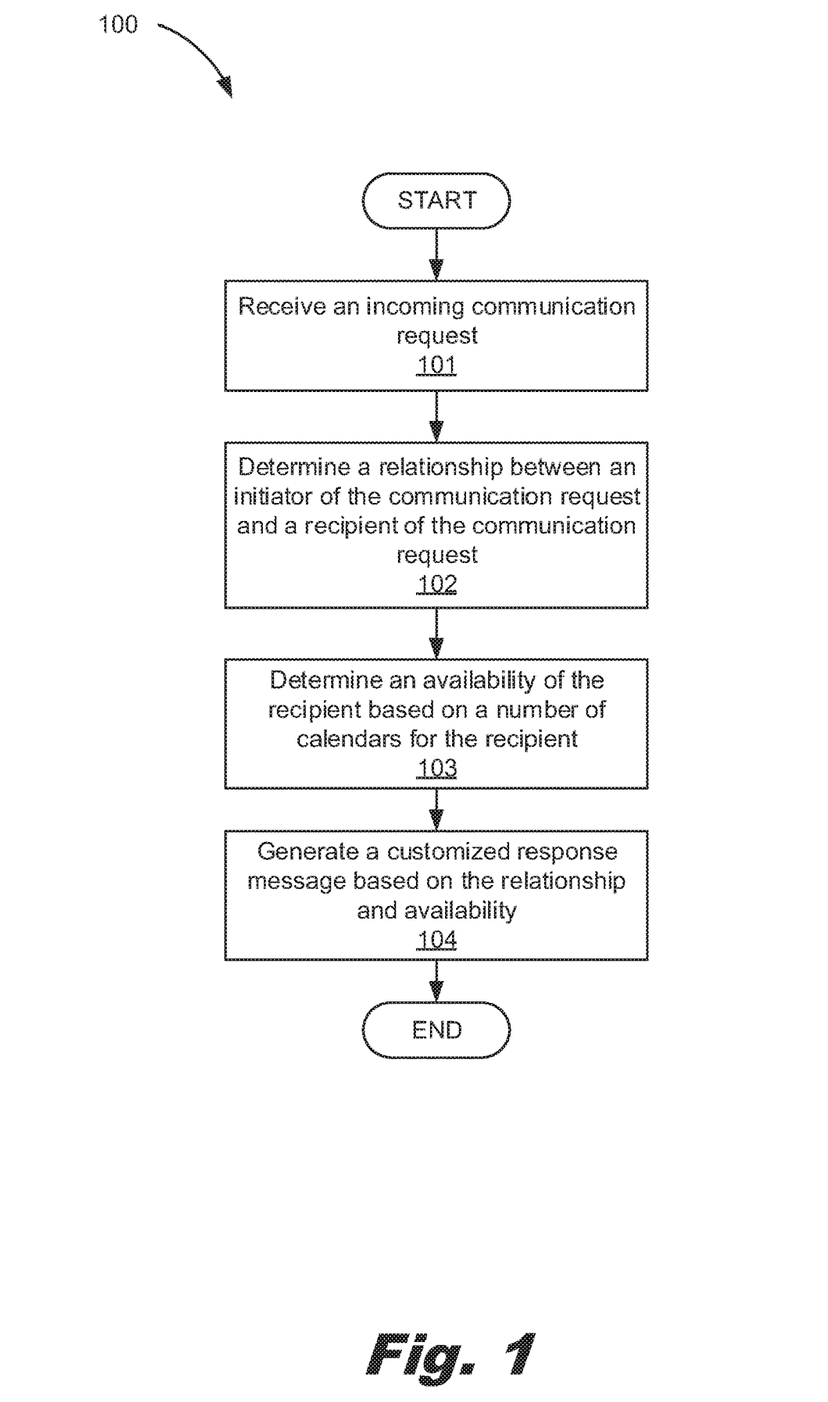
FIG. 1 depicts a flowchart of a method for generating a customized response message, according to an example of principles described herein.

Turning now to the figures, FIG. 1 depicts a flowchart of a method (100) for generating a customized response message, according to an example of principles described herein. According to the method (100), an incoming communication request is received (block 101). The incoming communication request may be of a variety of types. For example, the user may request voice communication via telephone or via a computer application. In another example, the form of communication may be via text message. That is, a first individual may send a text message to another individual. Again, such a text message request may be via a phone, such as a mobile phone or a computer application. As yet another example, a first user may send an email message, which is a request to communicate via email. While specific reference is made to particular types of communication, and thereby certain types of communication requests, any number of incoming communication request types could be received (block 101).

The system may then determine (block 102) a relationship between an initiator of the communication request and a recipient of the communication request. For example, the system may determine if the recipient and initiator have a close relationship, i.e., family/friends etc. or if the recipient and initiator have a professional relationship, i.e., manager/managee, co-workers. Such a relationship can be based on any number of factors. For example, the quantity and frequency of contacts can be indicative of the nature of a relationship. Accordingly, the system of the present specification may include a database of the different interactions between the users by which a relationship can be determined (block 102). In this example, the system extracts information related to a count of interactions between the initiator and the recipient, and does so across a variety of platforms. Accordingly, the system extracts count information from a number of platform databases. The system then can combine the different counts to generate an overall quantity, which may be a numerical representation, of the quantity of communications between the initiator and the recipient.

Another example of criteria on which a relationship is determined (block 102) is the format of the contact. For example, email messages may be more indicative of a professional relationship, where text messages and voice calls may be more indicative of a close relationship. Yet another example of relationship criteria is a timing of the communication request. For example, individuals having a professional relationship are less likely to communicate with one another outside of regular business hours. During extraction of information from each of the platform servers, format information is also extracted. For example, the system, identifies a server as an email server and can therefore associate the count of email messages between the initiator and the recipient as email communications.

As yet another example, the actual language/words used during previous correspondence can shed a light into a relationship between two individuals. For example, a mother may refer to her daughter as "honey" in text messages. By comparison, in a professional relationship titles such as "Mr.," "Mrs.," or "Sir," may be more prevalent. Accordingly, the system may include a natural language analyzer that scours the communications to determine the existence and frequency of certain trigger phrases such as those described above and others. If such words are found a predetermined amount of times, they can be interpreted to be the vernacular for that relationship and used in generating the customized response message.

In some examples, the relationship is determined based on a combination of these criteria. In other words, one criterion alone may not be dispositive. But when considered in the aggregate with many other criteria, these criteria can indicate whether a relationship between an initiator of a communication request and a recipient of the communication request is informal or professional and can learn other attributes of such a relationship.

The system also determines (block 103) an availability of the recipient based on a number of calendars for the recipient. For example, a user's desktop computer or mobile phone may include calendars that contain entries for non-work related matters and may also include professional calendars that contain entries for work, or other professional-related events. These entries include metadata indicating start and stop times for each calendar entry. From these calendars, the system can determine (block 103) whether a recipient is available to take the incoming communication. For example, a first user may initialize a phone call to the second user at 12:30 p.m. The second user's device may extract metadata from the calendar entry which indicates that a meeting the second user is current in terminates at 1:00 p.m. In other words, the system can determine that the second user is unavailable until the meeting terminates at approximately 1:00 p.m.

Based on this finding, a customized response is generated (block 104) and sent to the first user. The response may be customized in any number of ways. Specifically, the customized response may be based on the specific relationship between two people. Such a customized response may include a customized tone and/or customized vernacular based on the historical tone and vernacular of the initiator/recipient in previous correspondence. For example, a daughter may try to make a call to her mother, who is in a meeting. The system can learn from past interactions between the mother and daughter that the mother often refers to her daughter as "honey." Accordingly, the customized response may be generated where among others, the word "honey" is inserted. Accordingly the customized response may say, "Sorry honey, I am in a meeting. I'll call you later."

As described above, the customized response message may also be generated (block 104) based on the availability of the recipient. Accordingly, continuing the example above, the mother's calendar on her computer or on her mobile device, may indicate that the meeting is scheduled until 4:00 p.m. Accordingly, the customized response message may, based on extracted metadata from the calendar, indicate an estimated response time for the recipient based on an indicated termination time for the meeting. For example, the customized message from the above example may read. "Sorry honey, I am in a meeting. I'll call you back at 4." Accordingly, the customized response not only accounts for the historical interactions between the parties involved, but also lets the initiator know when they can expect to receive a response, and can thus plan accordingly. While specific reference is made to particular customizations, i.e., tone and vernacular, any number of customizations could be applied to the response message including a format of the response message. Additional examples of customizations are described below.

Such a method (100) for customization of response messages allows for a tailored response that 1) communicates to the initiator in a manner befitting previous correspondence with the initiator and recipient and 2) removes the formality of pre-created responses. Thus, some of the informality that results in non-face-to-face interaction is alleviated by allowing for customized response messages. Moreover, such customized messages can be generated with limited interruption to the user of the device that is generating the response.

Figure 2:
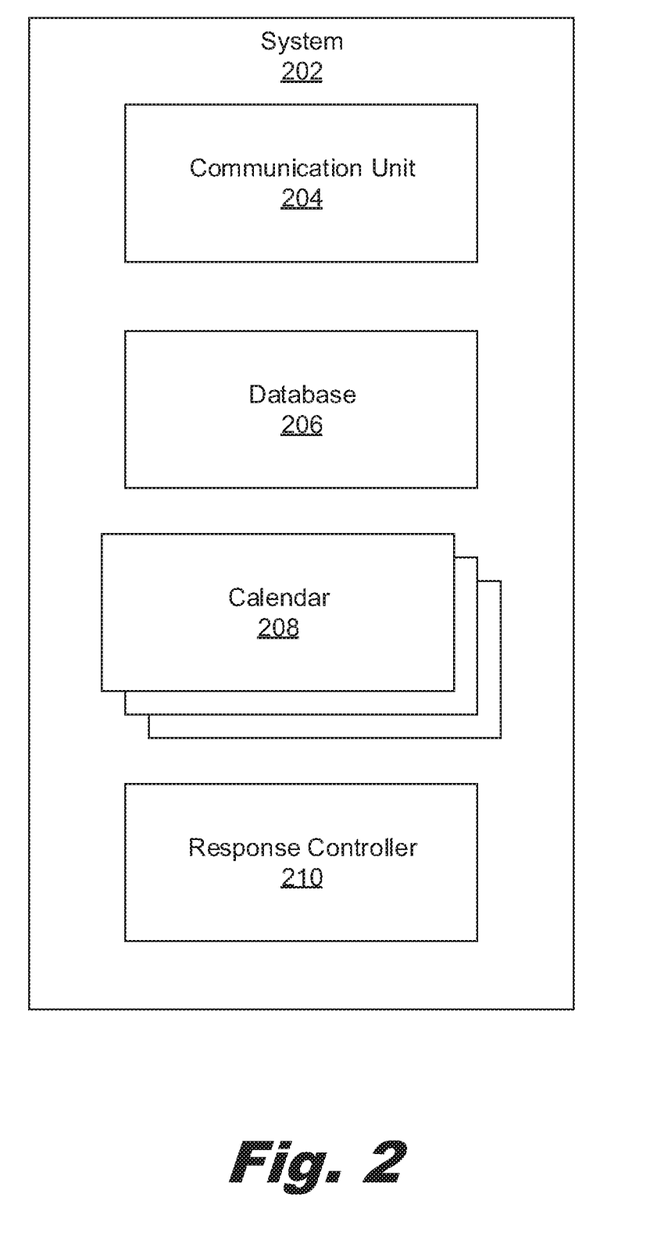
FIG. 2 depicts a system for generating a customized response message, according to an example of the principles described herein.

FIG. 2 depicts a system (202) for generating a customized response message, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The system (202) includes a communication unit (204). The communication unit (204) refers to any component of a system (202) that can send/receive a communication request to or from another individual. For example, the system (2020 may be a computer and the communication unit (204) may be an email module that allows a user to send email messages to other users. Still in the example where the system (202) is a computer, the communication unit (204) may be a teleconferencing module where a user can start a video or audio conference call with another user. In still another example, the system (202) may be a computer and the communication unit (204) may be an instant messaging module where a user can sent instant text messages to another user.

In some examples, the system (202) may be another computing device such as a mobile phone. In one example of this scenario, the communication unit (204) may be a transceiver that allows a user to receive and make telephone calls. In another example of this scenario, the communication unit (204) may be a text messaging module that allows a user to receive text messages. While specific reference is made to particular systems (202) and communication units (204), other examples are also possible.

The system also includes a database (206). The database (206) includes relationship information between a number of users. Specifically, the database (2060 includes this type of relationship information between an initiator of a communication request and a recipient of a communication request. More specifically, the database (206) may include information from which a relationship between various users may be indicated. Specifically, the database (206) may include information regarding the details, or characteristics, of previous correspondence between each pairing of a number of users on a network. Examples of such information may include a record of contacts, and characteristics of those contacts via various communication platforms, between users. For example the database (206) may indicate a time and duration of phone calls, text messages, emails, and other instant messages that were made between pairings of users. This information in the database (206) may be retrieved from various servers relating to the different communication units (204). For example, the database (206) may extract such information from hardware memory devices associated with each communication platform.

The database (206) may also include the results of a natural language analyzer. For example, a natural language analyzer may determine a common vernacular between pairings of users. This information is then copied to the database (206) for user in generating a customized response message.

In some examples, the database (206) is updateable. That is, the database (206) may be updated to reflect changes in the relationship between users. That is, for a given period of time two users may not know each other very well and may not share regular communication, thus suggesting a formal relationship which may lead to the generation of a similarly formal customized response message. However, that relationship may change over time such that communication becomes more regular, with a particular vernacular suggesting a more informal relationship. Thus, a commensurately informal customized response message may be generated and sent. Accordingly, the system (202) continuously monitors relationships between individuals and updates the database (206) to be reflective of any changes in relationship that may occur.

The system (202) also includes a number of calendars (208) for a recipient of the communication request. For example a user may have any number of calendars (208) that keep track of non-work related calendar events. The same user may have any number of professional calendars (208) that keep track of work and other professional related events. Information extracted from these calendars (208) including metadata indicating start times and stop times is used to generate customized responses and to determine if a user is available. That is from these calendars (208), the system (202) can determine 1) the availability/unavailability of a user to respond to a request for communication and 2) an estimated response time for when a user, if unavailable, can respond to a request for communication.

The system (202) also includes a response controller (210) to generate the customized response messages that 1) are based on the relationship between the initiator and the recipient of the communication request and 2) indicate an estimated response time for the recipient based on the availability of the recipient. In some examples, the response controller (210) generates such a message responsive to a refusal to accept the incoming communication request. For example, a second user's mobile phone may vibrate and/or ring to indicate a request for communication from a first user. In this example, the second user may touch a button, or interface with a part of a touchscreen to refuse the call. Responsive to this, the response controller (210) generates the customized response message.

In another example, the response controller (210) may generate the response absent such user input. For example, the system (202) based on the calendars (208) may determine that a user is in a meeting. Accordingly, without waiting for the user to respond, the response controller (210) may generate the appropriate customized response message based on the user's availability and the recipient's relationship with the initiator of the request.

Accordingly, the present system (202) learns from contact, and over the course of time, can respond appropriately given a relationship between two individuals. As will be described below, the system (202) may rely on voice recognition, types of previous contact (including emails, texts, messaging systems), information in a profile, nature, and vernacular of the previous contact to determine an appropriate response. The more correspondence between two people, the more accurate the customized response message will be.

Figure 3:
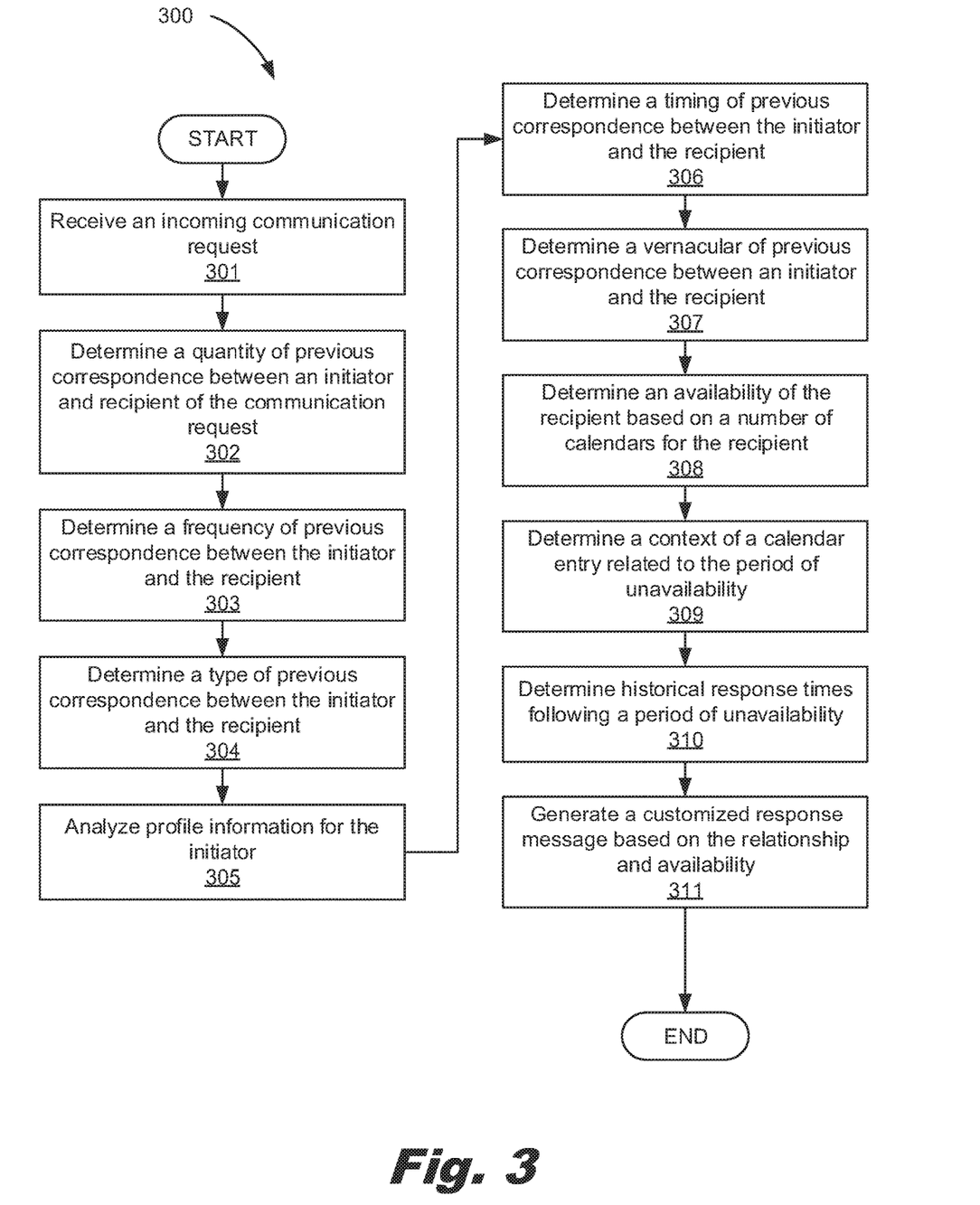
FIG. 3 depicts a flowchart of a method for generating a customized response message, according to an example of principles described herein.

FIG. 3 depicts a flowchart of a method (300) for generating a customized response message, according to an example of principles described herein. According to the method (300), an incoming communication request is received (block 301). This may be performed as described above in connection with FIG. 1.

As described above, a relationship between an initiator of the communication request and a recipient of the communication request is determined. Also as described above, such a relationship, or rather the determination of such a relationship is based on a number of factors. Accordingly, determining the relationship can include acquiring, and analyzing information relating to such factors. For example, the system (FIG. 2, 202) may determine (block 302) a quantity of previous correspondence between an initiator and recipient of the communication request. Specifically, whether within a close, familial, or professional relationship, a higher quantity of previous correspondence indicates a stronger relationship between individuals. The information regarding the quantity of previous correspondence may be collected from the database (FIG. 2, 206) that includes information relating to the previous correspondence between the initiator and the recipient. In this example, one or more metrics may be used to determine whether the quantity of communications is indicative of a professional or non-professional relationship.

In some examples, the determination (block 302) of previous contact is across more types of communication than that which the incoming request was received (block 301) on. For example, the incoming request may be received (block 301) via a telephonic communication unit (FIG. 2, 204) of a mobile device system (FIG. 2, 202). However, the quantity of previous correspondence considered may include not only previous telephonic communications, but also text messages of the mobile device system (FIG. 2, 202) between the users, video conferences between the users on computers, and email messages between the users on their computers. In other words, the quantity of previous correspondence accounts for various forms of communication in addition to the form of communication on which the request was received (block 301).

In one example, the system (FIG. 2, 202) determines (block 303) a frequency of previous correspondence between the initiator and the recipient. In this example, more frequent communication is indicative of greater familiarity and therefore a closer relationship. For example, an initiator and a recipient may share a large quantity of correspondence, however, a large chunk of those correspondence may have occurred in the past and that currently, the initiator and the recipient do not communicate that frequently. Such information indicates that 1) in the past the initiator and recipient had a stronger relationship due to the increased frequency of contact and that 2) now the relationship is more formal, i.e., not as strong, as indicated by the reduced frequency with which the two communicate. As with the quantity of previous correspondence, the determination (block 303) of the frequency of communication may consider more than just the type of communication on which the request was received. As a specific example, the system (FIG. 2, 202) extracts timestamp information related to previous communications, for example from a communications unit (FIG. 2, 204), to determine how close together previous correspondence are.

Yet another factor on which a relationship is determined is a type of previous correspondence. As used in the present specification, and in the appended claims, the "type" of previous communication refers to a format of the communication. For example, an email message may be one type of communication and a text message may be another type. Other examples of types of communication include instant messaging communication, video conference communication, telephonic communication, and collaborative messaging communication, among others. While specific reference is made to particular types of communication types, other types of communication are considered as well.

In this example, certain types of communication may be indicative of a professional relationship as compared to a non-professional relationship. For example, if a large chunk of the previous communication are email messages, this may indicate a professional relationship between the two individuals. By comparison, if a large chunk of the previous communications are text messages, this may indicate a more non-professional relationship between the two individuals. Accordingly, the system (FIG. 2, 202) may determine (block 304) a type of previous correspondence between the initiator and recipient and may determine a relative quantity of each type of previous correspondence.

In one example, the system (FIG. 2, 202) determines the relationship between individuals by analyzing (block 305) profile information for the initiator. More specifically, the system (FIG. 2, 202) analyzes (block 305) profile information for the initiator as stored on the recipient's computing device. For example, a recipients computing device may include contact lists that include various fields, which include a name, title, relationship etc. The system (FIG. 2, 202) can scour these fields and identify trigger words, as included in a library or that are generated via a machine-learning system, that indicate either a non-professional or professional relationship. For example, if profile information for the initiator includes an identifier of "mom," or "dad," it may be presumed that the relationship is non-professional and therefore stronger. Other examples of profile information that may indicate a more close relationship include the use of nicknames. By comparison, profile information that includes a first and last name, as well as a company affiliation may be more indicative that a relationship is professional and more formal. Other information from a user's profile may be analyzed (block 305) to determine a level of familiarity. Examples include, annotations, avatars, domain names for email addresses, and social media contact information, among others.

Yet another factor in determining the relationship between the initiator and the recipient is the timing or previous contact. For example, previous correspondence between an initiator and recipient that mainly occurs during business hours, i.e., 8-5 and does not occur on the weekends is indicative of a professional relationship. By comparison, communication that occurs throughout the day, in addition to evenings and weekends, may indicate a more friendly/familial relationship. Accordingly, using this data as stored in the database (FIG. 2, 206) the system (FIG. 2, 202) determines (block 306) a timing of previous correspondence between the initiator and the recipient. That is, the system can analyze time-stamp information related to various correspondence. If the time-stamp indicates that the communications occur mainly, or exclusively, within a predefined period of time, such as during business hours, the system (FIG. 2, 202) may characterize this communication as indicative of a professional relationship.

In determining the relationship between users, the system (FIG. 2, 202) determines (block 307) a vernacular of previous correspondence. For example, the use of icons in previous correspondence indicates a more familiar relationship as compared to a professional relationship. Moreover, slang and nicknames may be more indicative of a more informal relationships whereas professional relationships may be characterized by more formal vernacular. Accordingly, the system (FIG. 2, 202) may analyze the previous correspondence using a natural language analysis to determine (block 307) the vernacular and tone of previous correspondence. This information may be used to determine the relationship between the initiator of the request and a recipient of the request.

The system (FIG. 2, 202) may, based on a number of calendars (FIG. 2, 208) for the user, determine (block 308) an availability of the recipient. This may be performed as described above in connection with FIG. 1. Additionally, the system (FIG. 2, 202) may determine (block 309) a context of a calendar entry related to the period of unavailability. The context of the calendar entry may include whether the period of unavailability is related to a professional appointment or other appointment. Moreover, the context may indicate whether this is a regularly-scheduled appointment such that data may be acquired indicating a historical behavior relating to response messages. For example, the context may indicate that based on the nature of the meeting, 1) the user does not respond when attending this meeting and 2) the user historically responds no sooner than 15 minutes following the end of these meetings. Other contextual information may provide other data upon which an estimated response time is provided. The context of the calendar entry may include a list of participants and associated profile information. For example, the profile information for the participants in the calendar entry may include fields identifying them by their title within an organization. Accordingly, such profile information for each participant can be analyzed and patterns recognized, such as all, or most, are managers, or all or most, are associated with the same department. Accordingly, it can be determined that such a calendar entry relates to a professional matter and can indicate the type of calendar entry.

In another example, the system (FIG. 2, 202) determines (block 310) a historical response following a period of unavailability. For example, a user's calendars may indicate that a user is unavailable, i.e., in a meeting until 2:00 pm, however information in the database (FIG. 2, 206) may indicate that a user does not generally contact anyone until 2:15 following this type of meeting. Accordingly, the system (FIG. 2, 202), in response to an incoming request for communication, extracts the information from the calendar (FIG. 2, 208) indicating the termination of the meeting and extracts information from the database (FIG. 2, 206) which indicates historical communications indicating when a user responds to communications and generates a customized response that indicates that the recipient will respond at 2:15 pm.

While specific reference is made to particular characteristics of previous communication that are used to determine a relationship between an initiator and a recipient of a communication request and to particular customizations that may be used in generating a response message, different types and numbers of criteria may be used, in any combination, and any number and type of customizations may be applied to a response message.

Based on all this information, a customized response may be generated (block 311) based on the relationship and availability. This may be performed as described above in connection with FIG. 1. More specifically, the customized response message may be customized in any number of ways. For example, the response may have a customized vernacular and tone based on the gathered information related to previous correspondence between the individuals. In another example, the customized response may have a customized format. For example, if the relationship is deemed to be a professional relationship, rather than send a text message responsive to a request for a phone call, the response controller (FIG. 2, 210) may generate a response email letting the initiator know that the recipient will be unavailable for a certain period of time.

Another specific example, is provided. In this example, the recipient is presenting at a conference but is expecting a call from a client, therefore the relationship is professional and formal and has had frequent contact with the client over the past three weeks. In this example, the client calls during the presentation and the system (FIG. 2, 202) recognizes via the frequency of contact, and type of contact, that the client is relevant. Accordingly, the system (FIG. 2, 202) has learned how to address the client and generates (block 311) a customized response message that is professional in tone, and in email format which states, "Mr. Smith, I am currently presenting at a conference. However, the presentation ends at 5 pm EST. I will call you directly after the presentation. I look forward to talking with you." Accordingly, the system (FIG. 2, 202) and method (300) described herein provide for a response message that is tailored based on the relationship between the initiator and the recipient and that also communicates in an effective tone, vernacular, and format given the particular relationship.

Figure 4:
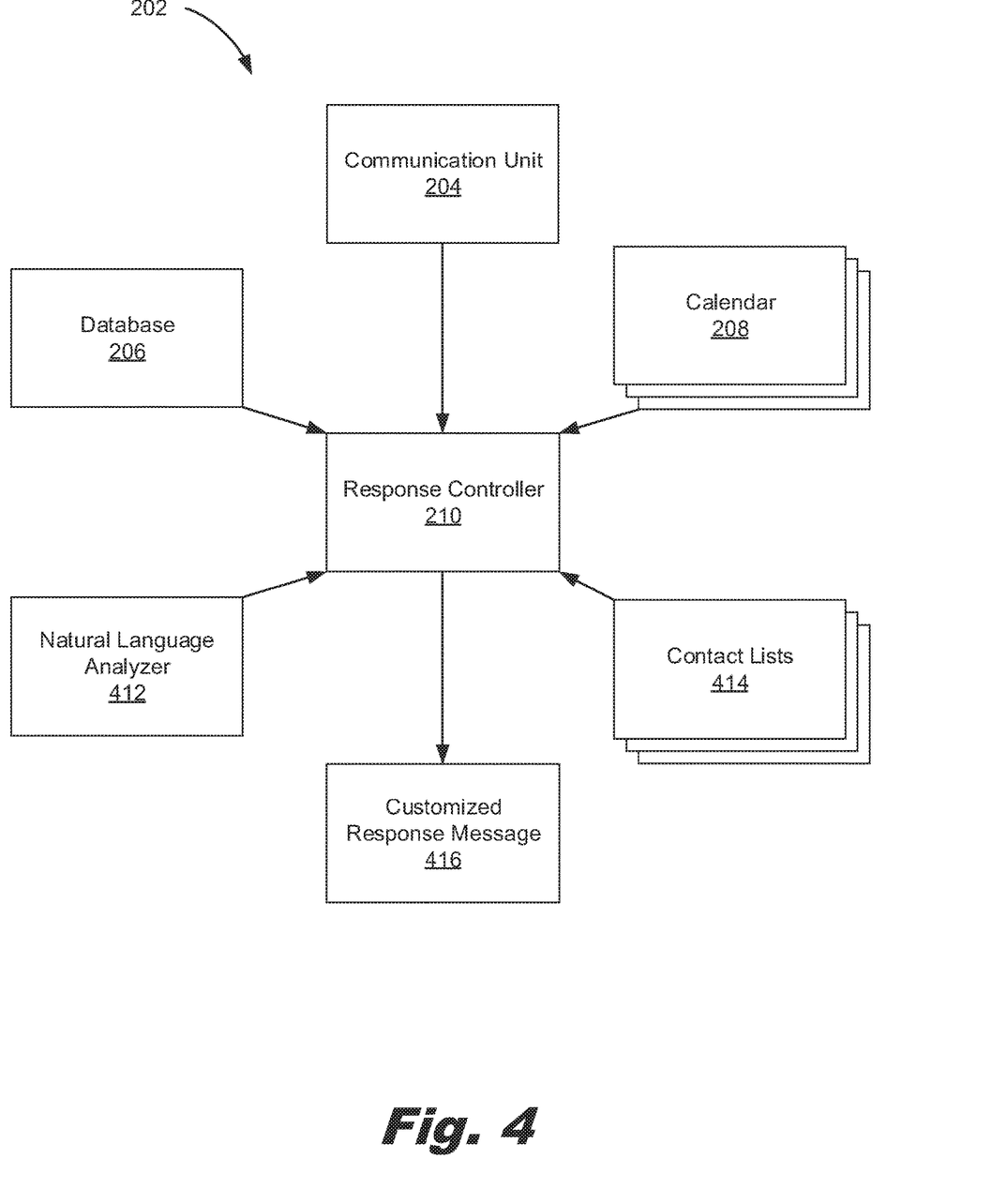
FIG. 4 depicts a system for generating a customized response message, according to an example of the principles described herein.

FIG. 4 depicts a system (202) for generating a customized response message, according to an example of the principles described herein. As described above, the system (202) may include a communication unit (204), database (206), and calendars (208) for use in generating a customized response message (416).

In some examples, the system (202) includes other components that provide addition information on which to base an estimated arrival time. For example, the system (202) includes a natural language analyzer (414) to determine a vernacular of the previous correspondence between the initiator and the recipient. As described above, this may include determine the formality/informality of previous correspondence based on analyzing the words, phrases, and icons used in previous correspondence. In this example, the natural language analyzer determines the presence and occurrence of certain phrases and can use those phrases in the construction of a corresponding customized response message.

The system (202) also includes multiple contact lists (414) for the recipient which contact lists include information that is reflective of the relationship between an initiator and a recipient. For example, one initiator may be included on a recipient's non-professional contact list thus indicating a non-professional relationship, for example, familial relationship. In another example, the contact list may be a work contact list, thus indicating that the users share a professional relationship.

Figure 5:
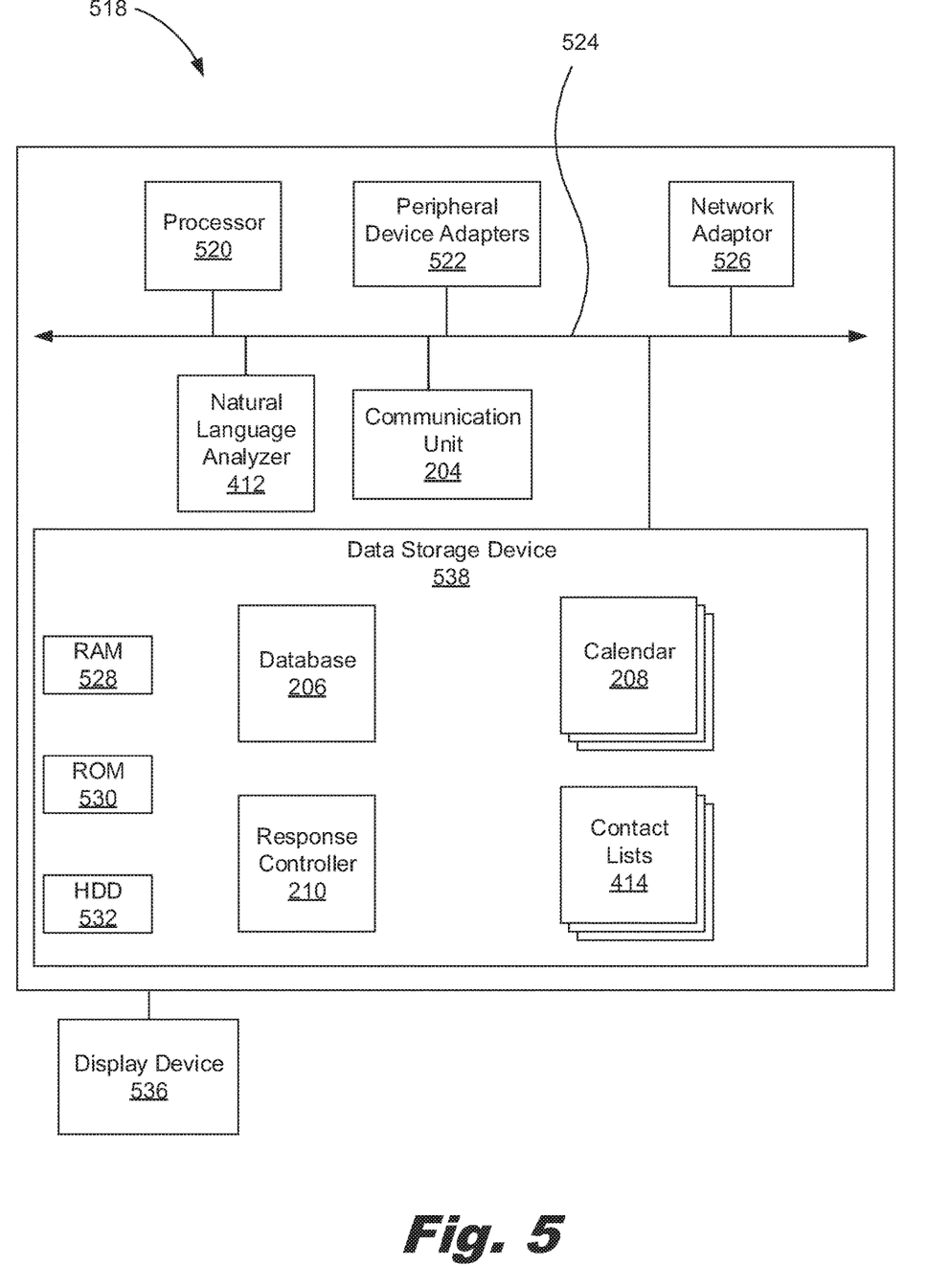
FIG. 5 is a diagram of a computing system for generating a customized response message, according to an example of the principles described herein.

FIG. 5 is a diagram of a computing system (518) for generating a customized response message (FIG. 4, 416), according to an example of the principles described herein.

The computing device (518) may be implemented in an electronic device. Examples of electronic devices include servers, desktop computers, laptop computers, personal digital assistants (PDAs), mobile devices, smartphones, gaming systems, and tablets, among other electronic devices.

The computing device (518) may be utilized in any data processing scenario including, stand-alone hardware, mobile applications, through a computing network, or combinations thereof. Further, the computing device (518) may be used in a computing network. In one example, the methods provided by the computing device (518) are provided as a service over a network by, for example, a third party.

To achieve its desired functionality, the computing device (518) includes various hardware components. Among these hardware components may be a number of processors (520), a number of data storage devices (538), a number of peripheral device adapters (522), and a number of network adapters (526). These hardware components may be interconnected through the use of a number of busses and/or network connections. In one example, the processor (520), data storage device (538), peripheral device adapters (522), and a network adapter (526) may be communicatively coupled via a bus (524).

First, the computing device (518) includes a communication unit (204) which refers to hardware used to communicate with other communication units. The communication unit (204) includes hardware to receive incoming communication requests and to send response messages to such requests. The computing device (518) also includes a natural language analyzer (412) that monitors vocal or text communications to identify certain vernacular specific to a particular relationship.

The processor (520) may include the hardware architecture to retrieve executable code from the data storage device (538) and execute the executable code. The executable code may, when executed by the processor (520), cause the processor (520) to implement at least the functionality of generating a customized response message (FIG. 4, 416). The functionality of the computing device (518) is in accordance to the methods of the present specification described herein. In the course of executing code, the processor (520) may receive input from and provide output to a number of the remaining hardware units.

The data storage device (538) may store data such as executable program code that is executed by the processor (520) or other processing device. As will be discussed, the data storage device (538) may specifically store computer code representing a number of applications that the processor (520) executes to implement at least the functionality described herein.

The data storage device (538) may include various types of memory modules, including volatile and nonvolatile memory. For example, the data storage device (538) of the present example includes Random Access Memory (RAM) (528), Read Only Memory (ROM) (530), and Hard Disk Drive (HDD) memory (532). Many other types of memory may also be utilized, and the present specification contemplates the use of many varying type(s) of memory in the data storage device (538) as may suit a particular application of the principles described herein. In certain examples, different types of memory in the data storage device (538) may be used for different data storage needs. For example, in certain examples the processor (520) may boot from Read Only Memory (ROM) (530), maintain nonvolatile storage in the Hard Disk Drive (HDD) memory (532), and execute program code stored in Random Access Memory (RAM) (528).

The data storage device (538) may include a computer readable medium, a computer readable storage medium, or a non-transitory computer readable medium, among others. For example, the data storage device (538) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (522, 526) in the computing device (518) enable the processor (520) to interface with various other hardware elements, external and internal to the computing device (518). For example, the peripheral device adapters (522) may provide an interface to input/output devices, such as, for example, display device (536), a mouse, or a keyboard. The peripheral device adapters (522) may also provide access to other external devices such as an external storage device, a number of network devices such as, for example, servers, switches, and routers, client devices, other types of computing devices, and combinations thereof.

The display device (536) may be provided to allow a user of the computing device (518) to interact with and implement the functionality of the computing device (518). The peripheral device adapters (522) may also create an interface between the processor (520) and the display device (536), a printer, or other media output devices. The network adapter (526) may provide an interface to other computing devices within, for example, a network, thereby enabling the transmission of data between the computing device (518) and other devices located within the network.

The computing device (518) may, when executed by the processor (520), display the number of graphical user interfaces (GUIs) on the display device (536) associated with the executable program code representing the number of applications stored on the data storage device (538). The GUIs may display, for example, interactive screenshots that allow a user to interact with the computing device (518) to input values in association with the memristive array (100) as will be described in more detail below. Additionally, via making a number of interactive gestures on the GUIs of the display device (536), a user may obtain a dot product value based on the input data. Examples of display devices (536) include a computer screen, a laptop screen, a mobile device screen, a personal digital assistant (PDA) screen, and a tablet screen, among other display devices (536).

The computing device (518) further includes a number of modules used in the implementation of the systems and methods described herein. The various modules within the computing device (518) include executable program code that may be executed separately. In this example, the various modules may be stored as separate computer program products. In another example, the various modules within the computing device (518) may be combined within a number of computer program products; each computer program product including a number of the modules.

As described above, the computing device (518) may include a database (206) that includes information from which a relationship between an initiator and recipient can be determined. Calendars (208) as well as contact lists (414) are used by a response controller (210) to generate the customized response message (FIG. 4, 416).

Figure 6:
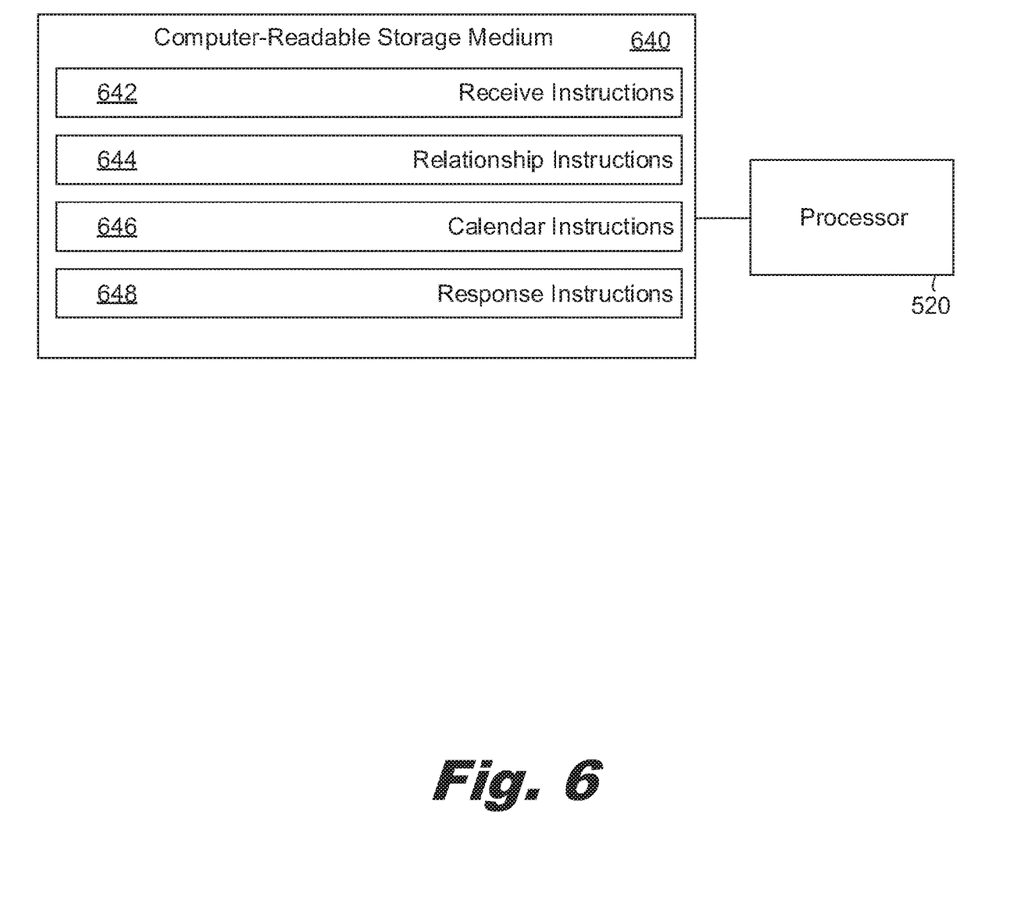
FIG. 6 depicts a computer readable storage medium for generating a customized response message, according to an example of principles described herein.

FIG. 6 depicts a computer readable storage medium (640) for generating a customized response message (FIG. 4, 416), according to an example of principles described herein. To achieve its desired functionality, a computing system includes various hardware components. Specifically, a computing system includes a processor (520) and a computer-readable storage medium (640). The computer-readable storage medium (640) is communicatively coupled to the processor (520). The computer-readable storage medium (640) includes a number of instructions (642, 644, 646, 648) for performing a designated function. The computer-readable storage medium (640) causes the processor (520) to execute the designated function of the instructions (642, 644, 646, 648).

Referring to FIG. 6, receive instructions (642), when executed by the processor (520), cause the processor (520) to receive an incoming communication request. Relationship instructions (644), when executed by the processor (520), may cause the processor (520) to determine a relationship between an initiator of the communication request and a recipient of the communication request based on 1) a quantity of previous correspondence, 2) a frequency of previous correspondence, 3) a type of previous correspondence, 4) a timing of previous correspondence, 5) a vernacular of previous correspondence and 6) profile information for the initiator. In some examples, the relationship may be based on voice recognition between the recipient and initiator. For example, to analyze the vernacular, tone, and emotion used during such communications.

Calendar instructions (646), when executed by the processor (520), may cause the processor (520) to, determine, based on a number of calendars (FIG. 2, 208) for the recipient, an availability of the recipient. Response instructions (648), when executed by the processor (520), may cause the processor (520) to based on a determined unavailability of the recipient, generate a customized response message (FIG. 4, 416) which is based on a relationship between the initiator and the recipient and indicates an estimated response time for the recipient based on the availability of the recipient and the historical response times following a period of unavailability for the recipient.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Such a system facilities a customized response that may alleviate any social awkwardness or miscommunication that may result from pre-created generic messages. Moreover, by reviewing a person's calendars, the response message presents the initiator of the request with an estimated time of response, which is more efficient than requiring the initiator to wait without any expectation of when a response will be received. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving an incoming communication request;
determining a relationship between an initiator of the incoming communication request and a recipient of the incoming communication request;
determining, based on a number of calendars for the recipient, an availability of the recipient; and
based on a determined unavailability of the recipient, generating a customized response message, which customized response message:
is based on the relationship between the initiator and recipient; and
indicates an estimated response time for the recipient based on the availability of the recipient as determined from the number of calendars for the recipient.

2. The computer-implemented method of claim 1, wherein determining a relationship between the initiator and the recipient comprises determining a quantity of previous correspondence between the initiator and the recipient.

3. The computer-implemented method of claim 2, wherein determining a quantity of previous correspondence between the initiator and the recipient accounts for correspondence across more types of communication than that on which the communication request is received.

4. The computer-implemented method of claim 1, wherein determining a relationship between the initiator and the recipient comprises determining a frequency of previous correspondence between the initiator and the recipient.

5. The computer-implemented method of claim 1, wherein determining a relationship between the initiator and the recipient comprises determining a type of previous correspondence between the initiator and the recipient.

6. The computer-implemented method of claim 1, wherein determining a relationship between the initiator and the recipient comprises is based on profile information of the initiator on a recipient communication unit.

7. The computer-implemented method of claim 1, wherein determining a relationship between the initiator and the recipient comprises determining a timing of previous correspondence between the initiator and the recipient.

8. The computer-implemented method of claim 1, wherein the customized response message has a customized vernacular based on the relationship between the initiator and the recipient.

9. The computer-implemented method of claim 1, wherein the customized response message has a customized tone based on the relationship between the initiator and the recipient.

10. The computer-implemented method of claim 1, wherein the customized response message has a format based on the relationship between the initiator and the recipient.

11. The computer-implemented method of claim 1, wherein the estimated response time accounts for historical response times following a period of unavailability for the recipient.

12. The computer-implemented method of claim 1, wherein the estimated response time is based on a context of a calendar entry relating to a period of unavailability for the recipient.

13. A system comprising:
a communication unit to receive an incoming communication request;
a database comprising relationship information between a number of users, wherein the number of users comprises an initiator of the communication request and a recipient of the communication request;
a number of calendars for the number of users;
a response controller to:
based on a determined unavailability of the recipient, generate a customized response message, which customized response message;
is based on the relationship between the initiator and the recipient;
is based on historical interactions between the initiator and the recipient;
has a vernacular and tone that match a historical vernacular and tone between the initiator and the recipient; and
indicates an estimated response time for the recipient based on the availability of the recipient as determined from the number of calendars for the recipient.

14. The system of claim 13, wherein:
the system comprises a natural language analyzer to determine a vernacular of previous correspondence between the initiator and recipient; and
the relationship information is reflective of the vernacular of the previous correspondence.

15. The system of claim 13, wherein the database is updated to reflect changes in the relationship.

16. The system of claim 13, wherein:
the system comprises multiple contact lists for a recipient; and
the relationship information is reflective of which contact list an initiator belongs to.

17. The system of claim 13, wherein the response controller generates the customized response message based on a refusal to accept the incoming communication request.

18. A computer program product, the computer program product comprising a computer readable storage medium having program instructions embodied therewith, the program instructions executable by a processor to cause the processor to:
receive an incoming communication request;
determine a strength of a relationship between an initiator of the communication request and a recipient of the communication request based on:
a quantity of previous correspondence; and
a frequency of previous correspondence;
determine a formal nature of the relationship between the initiator and the recipient based on:
a type of previous correspondence;
a time of day when previous correspondence were sent;
a vernacular of previous correspondence; and
profile information of the initiator;
determine, based on a number of calendars for the recipient, an availability of the recipient; and
based on a determined unavailability of the recipient, the strength of the relationship, and the formal nature of the relationship, generate a customized response message, which customized response message:
is based on the relationship between the initiator and the recipient;
is based on historical interactions between the initiator and the recipient;
has a vernacular and tone that match a historical vernacular and tone between the initiator and the recipient; and
indicates an estimated response time for the recipient based on:
the availability of the recipient; and
historical response times following a period of unavailability for the recipient.

19. The computer program product of claim 18, wherein the incoming communication request is based on a communication formal selected from the group consisting of a text message, a voice call, an email message, and an instant message.

20. The computer program product of claim 19, wherein the relationship between the initiator and the recipient is further based on voice recognition of the recipient and initiator.

* * * * *